United States Patent Office 3,151,037
Patented Sept. 29, 1964

3,151,037
ENCASED FUEL
James R. Johnson, White Bear Lake, and Harold G. Sowman, Maplewood, Minn., assignors to Minnesota Mining and Manufacturing Company, St. Paul, Minn., a corporation of Delaware
No Drawing. Filed Feb. 21, 1961, Ser. No. 90,656
7 Claims. (Cl. 176—67)

This invention relates to fuels for nuclear reactors and more particularly to particles of fissionable material encased in ceramic materials.

It is known that the design of nuclear reactors for use in high temperatures at which they will be most efficient requires encasing the fissionable fuel materials to avoid corrosion and minimize the escape of fission products. While encasement of fuel elements in metal has been used for operation at low temperatures in connection with fuel elements of relatively large size, such expedients are not practical for use at temperatures of the order of 2500° C. or higher. Under these conditions, the use of refractory substances for encasement appears to be imperative. However, when ceramic materials are used as containers for relatively large-sized fuel elements, many problems arise with respect to the fragility of such containers, handling in the reactor, etc.

It has been proposed that fissionable materials be coated with refractory substances, for example, alumina, pyrolytic carbon and the like. Fissile fuels of ordinary size coated with or encased in refractory materials can withstand high temperatures and may be very resistant to corrosion. However, it is very difficult to provide coatings of this type on small particles which do not crack when heated to extremely high temperatures, of the order of that required to melt the fissionable materials, owing to the difference between coefficients of expansion of the ceramic coatings and of the fissionable material, and the pressure produced by accumulation of fission products. Consequently, so far as is known, it has not heretofore been possible to produce a coated particle which is useful at temperatures where the fissionable material is molten and up to the point at which the refractory coating itself fails from the effects of the heat.

It is an object of this invention to provide a nuclear fuel particle having a refractory coating which is substantially impermeable to fission products, and which is useful at temperatures up to the point at which the coating fails. It is another object of this invention to provide nuclear fuel particles containing fissionable material, which are especially useful for incorporation into large fuel elements. Still another object of the invention is to provide fuel elements useful in reactors at extremely high temperatures. Other objects of the invention will be apparent from the disclosure hereinafter made.

In accordance with the above and other objects of the invention, it has now been found that nuclear fuel particles can be made in which the solid fissionable material has a smaller volume than the interior volume of the refractory shell which encases it at any temperature up to the point at which the shell itself fails.

By the term "particles" as used herein it is intended to refer to encased fissionable materials having dimensions of the order of not more than about 200 mils in diameter, and more specifically, to particles containing spherules of fissionable materials.

"Spherules" means substantially spherical structures having a diameter in the range of about 10 microns up to about 125 mils, and which have a generally smooth surface overall. Such spherules are generally formed from the molten state by the operation of surface tension, and the interior has a crystalline structure characteristic of the particular material which is used. The spherules when viewed under high magnification appear to have a surface consisting of minute facets which, however, when taken overall effectively produce spherical surfaces. The presence of such minute facets is not material. It is important that sharp points, or irregular surfaces with rough or reentrant areas be avoided although somewhat oblate or ovate shape, or the like, is not objectionable for the purposes of the invention.

The novel nuclear fuel particles of the invention are produced by one of several means. In one method, a spherule is produced which contains numerous voids throughout its volume. This spherule is then coated with an impermeable external shell of desired thickness, of the selected refractory material. In this case, the refractory material used must be higher melting than the fissionable material which is to be encased. Furthermore, the coating is done at a temperature lower than the melting point of the fissionable material used. After the coating is produced upon the surface of the spherule, under these conditions, the fuel particle can be subjected to temperatures which cause the fissionable material to melt, whereupon it decreases in volume owing to the elimination of the voids, and becomes smaller in diameter than the internal diameter of the shell. Thus, a space is left between the fissionable material and the outer shell, which provides room for expansion as well as accommodating gaseous fission products.

In an alternative procedure for the production of the novel fuel particles of the invention, a spherical particle of uranium metal is coated with a resinous material to form a substantially uniform coating over the entire spherical particle which is of the order of thickness which will provide enough carbon, following carbonization of the resin in an inert atmosphere, to react with the uranium to form uranium carbide. It is to be understood of course, that the uranium will not react with the carbon until proper conditions for reaction are attained, and that those conditions will be avoided until the application of the pyrolytic coating. Thus, following coating of the uranium particle with a resin, the resin is carbonized in an inert atmosphere, and the composite coated particle is then coated with pyrolytic carbon. Thereafter, the particles are heated to a temperature above the melting point of uranium, or until the uranium reacts with the carbon to form uranium carbide leaving a space between the shell and the fuel particle. This space, produced by the consolidation of the carbon and the uranium by reaction, contains, if anything, only a small amount of gas and therefore is at a lower pressure than atmospheric. This, as is pointed out hereinafter, is highly advantageous.

In another method for the preparation of the nuclear fuel particles of the invention, a spherule which is substantially free from voids is first coated with a uniform, substantially continuous coating of a foamed resin, of a thickness of the order of about 10-50 microns. Alternatively, the spherule is coated with a continuous layer of a carbonizable resin (synthetic polymer). Such initial coatings become carbonized upon heating, either before application of the encasing outer shell, or during its formation. In either case, the coating which is produced is a yielding coating, i.e., when pressure is applied to the coating it can be compressed to a smaller thickness. Following completion of the initial coating, the spherule is coated with the selected refractory material to form the impermeable encasement. The fuel particle is then ready for use, and in use, it is found that the yielding coating accommodates to the expansion of the fissionable material owing to heating, as well as providing space for gaseous fission products or swelling of the central fuel particle from the effects of radiation.

Fuel particles of spherical nature in which a space is provided within the shell which encases the fuel itself, to permit of free expansion of the contents of the shell, as well as containment of volatile fission products, are highly advantageous and represent a great advance over fuel particles which are simply composed of particles coated with ceramic or pyrolytic carbon. A particularly useful form of the fuel particles of the invention is that in which the gas pressure in the space between the encasing shell and the fissionable fuel is less than atmospheric pressure. Such particles can be made, for example, by producing spherules from very fine powders which have been pressed together into somewhat larger aggregates, and then sintered in the presence of an isolating medium such as carbon for a relatively short period of time in a vacuum furnace. While under these conditions the particles produced may be a great deal less regular in shape than those produced by longer heating, nevertheless, they are generally smooth in surface contour and contain desirable voids. Furthermore, these void spaces are at a pressure which corresponds roughly to the pressure in the furnace at the time of sintering, or melting. Accordingly, when such particles are coated with pyrolytic carbon, at a temperature below the melting point of the spherules, and then following coating, are heated so as to cause complete coalescence of the fissionable material in the spherule, the space which is formed between the spherule and the encasing shell is at a very much lower pressure than atmospheric pressure.

The advantages of having the space between the spherule of fissionable material and the shell of refractory material be at a pressure less than atmospheric will be appreciated by the art.

The fissionable and fertile materials which are employed in the fuel particles of the invention include such materials as uranium, uranium oxide, uranium carbide, uranium-thorium carbides, thorium carbide, thorium oxide, plutorium carbide and the like.

Refractory materials which can be employed for coating or encasement of the fuel particles of the invention include, for example, pyrolytic carbon and refractory materials such as the carbides of zirconium, tungsten and tantalum and the like. It will be apparent that the ultimate temperature to which the particle is subjected, as well as the conditions under which it is to be employed respecting problems of corrosion and the like and the particular fissionable material employed will determine the material which is selected for encasement. However, it will be apparent that when coated fuel particles are made according to the present invention, the coefficient of expansion of the refractory material employed is no longer of limiting significance, and therefore, much greater freedom can be exercised in the selection thereof.

It has been found that pyrolytic carbon is especially useful for the purposes of the invention, since it forms an extremely dense coating. The shell appears to consist of concentric, spherical laminae, and is extremely strong. Furthermore, such coatings are substantially impermeable to fission products.

With oxide fuels, such as uranium oxide, tungsten can be used advantageously.

The spherical fuel particles of the invention are extremely resistant to thermal and mechanical shock. Inasmuch as the fissionable material inside of the particles is not bonded to the refractory material of the shell it is free to expand and contract. At the same time, space is provided inside of the shell of the fuel particle, into which gaseous fission products can escape. Because of the strength of the shell, these gaseous products can accumulate until a considerable amount of pressure is built up inside of the shell, without rupture of the shell. Furthermore, if the coated particles are produced under conditions which provide reduced pressure in the free space, even less difficulty with gas pressure will be encountered.

It will be apparent from the foregoing that what is produced by the processes described herein is a nuclear fuel particle which consists essentially of a spherical, substantially impermeable shell of a refractory material which encloses a spherule of a normally solid fissionable material, the volume of the non-gaseous portion of the spherule being smaller than the volume of the interior of the shell at all temperatures below the point at which the refractory shell is itself destroyed by heat.

Typical dimensions of such a fuel particle are a spherule approximately 50 microns in diameter, a yielding coating on the surface of the spherule of about 20 microns thickness, and an external coating of refractory material of about 50 to 100 microns thickness. The result is a substantially spherical nuclear fuel particle, about 190 to 290 microns in diameter. The volume of the space which is available for expansion of the fissionable material is quite considerable. In the present instance, the volume available for expansion is several times the volume of the fissionable material. The "free space" sought is desirably from about one-half to about five times the volume of the fissile material, and preferably from about one to three times the volume of the fission material.

The starting materials for the process which results in the novel fissionable fuel products of the invention can be spherules made in any desired manner. A particularly useful process for producing spherules of uranium, thorium or uranium thorium carbides, for example, is the following: small irregularly shaped discrete particles of uranium carbide or uranium (thorium) carbide (by which is meant any solid solution of the two carbides, the one in the other) of desired size are mixed with an isolating medium of low density, for example very finely divided carbon, and rapidly heated to a temperature sufficient to form spherules by surface tension forces acting on the molten or semi-molten carbide. After cooling, the isolating material is removed from the spherules. The process is preferably carried out in a nonreactive atmosphere, for example, using helium or argon gas.

The invention will now be further described with reference to specific examples illustrating the best mode presently contemplated of carrying out the invention. In the examples, all parts are by weight unless otherwise specified.

*Example 1*

A mixture of 1 part of granules of pressed uranium oxide and carbon in 9:1 ratio and about 300 micron diameter and 2 parts by weight of "Thermatomic" carbon (furnace black) is made by placing the ingredients in a twin shell blender and mixing thoroughly. A batch of desired amounts is packed loosely in a carbon tube which is loosely fitted at both ends with threaded graphite plugs and which is of suitable size to fit into the furnace used.

The tube containing the batch of carbon-uranium oxide mixture is placed at the entrance of a carbon tube furnace about 3 feet long and 3 inches in diameter. The entrance end of the furnace is heated to about 1000° C., approximately the central one-third portion is heated to a temperature of about 2550° C., and the outlet end is cooled with water. The temperatures are determined optically. The furnace is constantly flushed with argon to provide a non-oxidizing atmosphere to prevent oxidation of the carbon. A sufficient amount of the argon enters the tube containing the batch to be fired so that an inert atmosphere is provided therein. The tube with the batch is permitted to heat at 1000° C. for four minutes. It is then moved to the central zone and there heated (fired) at 2550° C. Heating at this temperature for about 5 to 10 minutes produces more or less porous spherules, heating for about 30 minutes produces substantially void-free spherules. After firing the tube is moved to the end of the furnace, which is cooled with water and permitted to cool rapidly to below red heat. About five minutes are required for cooling, whereupon the tube is removed from the furnace, one plug removed and the batch is poured into an argon allutriation separator in which the finely divided carbon is blown away from the larger spherules of uranium carbide in a continuous winnowing operation. Nitrogen can also be employed. A conical vessel fitted for introduction of gas at the small lower end is provided with a foraminous (gas permeable) support near the same end on which the charge is placed. Passage of gas carries the fine particles away while the larger particles remain behind. The spherules which are obtained are about 100–200 microns in diameter. They are kept in an argon atmosphere.

If it is desired to employ uranium monocarbide instead of uranium dicarbide, the spherules obtained as set forth above are heated in dry hydrogen gas for about one hour at 1300° C. This material is extremely pyrophoric and must be handled with caution in an inert atmosphere.

The spherules thus obtained are placed in an apparatus for coating in which they are maintained in a fluidized bed. A machine such as that described by Wurster, in U.S. Patent No. 2,779,241, can be employed. While maintaining the spherules of uranium dicarbide in suspended, i.e. fluidized, condition, a solution of carboxymethyl cellulose in concentration of 5 percent in acetone is sprayed into the coating apparatus, a sufficient amount of the solution being employed for each 100 grams of spherules to produce a coating on the spherules approximately 30 microns in thickness. The thus-coated spherules are transferred to a graphite crucible and placed in an induction heated furnace provided with gas inlet and outlet connections and having means for rotating the crucible. A stream of argon containing 5 percent by volume of methane is passed through the furnace to displace the air therein and after thorough flushing, the crucible is rotated while heating the furnace by induction to a temperature in the range of about 1300–1400° C., as determined optically. The heating and rotation is continued for approximately one hour while a shell of pyrolytic carbon deposits uniformly over the entire surface. The flow of methane into the argon is then cut off and the stream of argon is continued while the crucible cools. During the heating period, the resin previously applied as a coating is carbonized and numerous voids formed therein. However, the shell of pyrolytic carbon formed on the spherules is continuous and is about 30 microns in thickness, being completely impermeable. The spherules thus coated can be heated to 3000° C., to cause melting of the uranium dicarbide in their interior, yet the exterior shell of the fuel particles thus produced does not crack and remains impermeable to fission products.

When the process is repeated employing an evacuated induction furnace (at about 50 mm. of Hg pressure) and introducing small volumes of about 25 percent by volume methane in argon so that the pressure does not rise above about 200 mm. of mercury and continuing the process for about 5 hours, particles of similar appearance are produced in which the encased space is found to be under reduced pressure.

The particles of the invention can be used in nuclear reactors designed to operate at relatively high temperatures, i.e. of the order of 1200–1500° C., and as noted will not be damaged by excursions of temperature far above this range.

What is claimed is:

1. A nuclear fuel particle, comprising in combination a spherule of a normally solid fissionable material having a smooth, substantially spherical surface and completely encased in a spherical self-supporting shell of a substantially impermeable refractory material of the group consisting of pyrolytic carbon and refractory metal carbides, the exterior diameter of said shell being up to about 200 mils and the interior volume enclosed by the said shell being greater than the volume of the non-gaseous portions of the said fissionable material at all temperatures below the melting point of said refractory material.

2. A nuclear fuel particle, comprising in combination a spherule of a normally solid fissionable material having a smooth, substantially spherical surface and completely encased in a spherical self-supporting shell of pyrolytic carbon, the exterior diameter of said shell being up to about 200 mils and the interior volume enclosed by said shell being greater than the volume of the non-gaseous portions of the said fissionable material at temperatures below about 3500° C.

3. A nuclear fuel particle, comprising a spherical self-supporting, substantially impermeable shell of a refractory material enclosing a spherule of a normally solid fissionable material the group consisting of pyrolytic carbon and refractory metal carbides, the exterior diameter of said shell being up to about 200 mils and the volume of the non-gaseous portions of said spherule being less than the volume enclosed by the interior of said shell at temperatures below the melting point of said refractory material.

4. A nuclear fuel particle, comprising in combination a spherule of a normally solid fissionable material completely encased in a self-supporting spherical shell of a substantially impermeable refractory material of the group consisting of pyrolytic carbon and refractory metal carbides up to about 200 mils in exterior diameter, the interior volume enclosed by the said shell being greater than the volume of the non-gaseous portions of the said fissionable materials at temperatures below the melting point of said refractory material, and the portion of the interior volume of the shell not occupied by solid being under a pressure less than normal atmospheric pressure.

5. A nuclear fuel particle, comprising a substantially spherical self-supporting shell of pyrolytic carbon enclosing a spherule of a normally solid fissionable material, the exterior diameter of said shell being up to about 200 mils in diameter the volume of the non-gaseous portions of said spherules being less than the interior volume enclosed by the said shell at temperatures below about 3500° C. and the interior of said shell being at a pressure less than about 15 lbs. per square inch at 25° C.

6. A nuclear fuel particle consisting of a self-supporting substantially spherical shell of pyrolytic carbon up to about 200 mils in exterior diameter enclosing a spherule of uranium carbide, the interior volume of said shell being greater than the volume of said uranium carbide spherule at temperatures below about 3500° C.

7. A nuclear fuel particle, comprising a substantially spherical shell of pyrolytic carbon up to about 200 mils in exterior diameter enclosing a spherule of a normally solid fissionable material, the volume enclosed by the non-gaseous portions of said spherule being less than the interior volume of the said shell at temperatures below about 3500° C.

References Cited in the file of this patent

UNITED STATES PATENTS

| 2,782,158 | Wheeler | Feb. 19, 1957 |
| 2,809,931 | Daniels | Oct. 15, 1957 |
| 2,820,751 | Saller | Jan. 21, 1958 |
| 2,879,216 | Hurwitz et al. | Mar. 24, 1959 |
| 2,915,815 | Bean et al. | Dec. 8, 1959 |
| 2,990,352 | Finniston et al. | June 27, 1961 |
| 3,004,907 | Precht et al. | Oct. 17, 1961 |
| 3,010,889 | Fortescue et al. | Nov. 28, 1961 |

FOREIGN PATENTS

| 754,559 | Great Britain | Aug. 8, 1956 |
| 209,972 | Australia | Feb. 28, 1957 |

OTHER REFERENCES

Proceedings of Second U.N. International Conference on Peaceful Uses of Atomic Energy, vol. 9, September 1958, page 307 relied upon.

TID 6506, August 1960, p. 99 relied upon.